United States Patent [19]

Smith, Jr.

[11] Patent Number: 4,625,111

[45] Date of Patent: Nov. 25, 1986

[54] METHOD AND APPARATUS FOR PULSED NEUTRON CAPTURE MEASUREMENT OF BOREHOLE CONDITIONS AND FORMATION HYDROGEN INDEX

[75] Inventor: Harry D. Smith, Jr., Houston, Tex.

[73] Assignee: Halliburton Company, Duncan, Okla.

[21] Appl. No.: 698,045

[22] Filed: Feb. 4, 1985

[51] Int. Cl.$^4$ ............................................. G01V 5/10
[52] U.S. Cl. ..................................... 250/270; 250/256
[58] Field of Search ........................ 250/270, 269, 256

[56] References Cited

U.S. PATENT DOCUMENTS

| | | | |
|---|---|---|---|
| 4,350,888 | 9/1982 | Peelman | 250/270 |
| 4,388,529 | 6/1983 | Peelman | 250/270 |
| 4,409,481 | 10/1983 | Smith, Jr. et al. | 250/270 |
| 4,424,444 | 1/1984 | Smith, Jr. et al. | 250/270 |

Primary Examiner—Alfred E. Smith
Assistant Examiner—Constantine Hannaher
Attorney, Agent, or Firm—William J. Beard

[57] ABSTRACT

A method is disclosed for the simultaneous determination of borehole (11) and earth formation (20) thermal neutron decay time components. The method, which employs pulsed high energy neutron sources (21) and time gated detectors (23,24), furnishes several quality indicators, along with appropriate criteria for selecting which to use. The method also furnishes a new indicator for the borehole capture cross section.

33 Claims, 6 Drawing Figures

METHOD AND APPARATUS FOR PULSED NEUTRON CAPTURE MEASUREMENT OF BOREHOLE CONDITIONS AND FORMATION HYDROGEN INDEX

BACKGROUND OF THE INVENTION

The present invention relates to in situ measurements of earth formations traversed by a well borehole. More particularly, the invention relates to pulsed neutron irradiation measurement techniques for in situ determination of the thermal neutron capture cross sections of earth formations in the vicinity of a borehole passing therethrough.

Pulsed (d,t) sources used in borehole logging produce neutrons which have energies of 14 Mev. These neutrons, when emitted into the borehole, are then moderated by interaction with the nuclei of the materials in the borehole and the surrounding earth formations as they diffuse therethrough. When the neutron energies have moderated to below about 0.05 electron volts, they come into thermal equilibrium with their environment. After reaching this thermal energy range, the neutrons continue diffusing through the formation and borehole until they are captured by nuclei in the constituent materials. The rate at which a zone of material (formation or borehole) captures these thermal neutrons (or more precisely, the probability of capture) is referred to as the macroscopic capture cross-section of the zone. The macroscopic capture cross-section is, in turn, a result of the combined microscopic capture cross-sections of the various constituent elements and materials constituting the zone. The capture cross-section of chlorine for thermal neutrons is considerably higher than that of most other elements commonly encountered in earth formations of interest. Accordingly, thermal neutron macroscopic capture cross-section measurements can give a good indication of the saline content of the fluids in the zone in question. By combining such information about the saline content of the fluids in the pore spaces of an adjacent earth formation with information about the formation water salinity, porosity measurements, and measurements of formation shaliness, information can be derived which can discriminate oil from salt water filled pore spaces in the vicinity of a well borehole.

Since thermal neutrons are absorbed by other materials as well as chlorine, the macroscopic capture cross-section is also responsive to borehole conditions and to the lithology of the formation materials. Prior art thermal neutron cross section methods have therefore typically been structured to try to minimize the borehole effects, for example by delaying the measurements after each neutron pulse so that these effects could then be ignored. That is, since borehole moderation and die away is usually faster than formation moderation and die away, the several measurements which are made are usually delayed until most of the borehole component has had sufficient time to decay. However, some residual borehole component relative to the formation component will usually be present, especially if the borehole contains materials which decay slowly and the formation contains material with a high cross section.

Another disadvantage of delaying the measurement gates to allow the borehole component to dissipate is the loss of important formation and borehole information during this long waiting period. Count rates are high and statistically important during early portions of the thermal neutron cycle, and such prior art delayed measurement methods fail to utilize this information.

Several important improvements in thermal neutron measurements are disclosed in U.S. Pat. Nos. 4,409,481 (Smith, Jr. et al., issued Oct. 11, 1983) and 4,424,444 (Smith, Jr. et al, issued Jan. 3, 1984), both assigned to the assignee of the present invention, the disclosures of which are incorporated herein by reference. In these inventions, at least four, and preferably six, capture gamma ray count rate measurements are made starting immediately after thermalization of the fast neutrons. From these measurements both the borehole thermal neutron lifetime component and the earth formation thermal neutron lifetime component are individually calculated using iterative least squares fitting of the count rate data. Rather than ignoring the borehole component, therefore, it is specifically identified, calculated, and separated from the formation component, substantially improving the accuracy of the formation thermal neutron lifetime measurement. Reference should also made to the following publications wherein additional aspects of these inventions are discussed: Smith, H. D., Jr., Arnold, D. M., and Peelman, H. E., "Applications of a New Borehole Corrected Pulsed Neutron Capture Logging System (TMD)", Paper DD, SPWLA Twenty Fourth Logging Symposium Transactions, June 1983; and Buchanan, J. C., Clearman, D. K., Heidbrink, L. J., and Smith, H. D., Jr., "Applications of TMD Pulsed Neutron Logs in Unusual Downhole Logging Environments", Paper KKK, SPWLA Twenty Fifth Logging Symposium Transactions, June 1984.

The logging systems disclosed in the above-noted U.S. Pat. Nos. 4,409,481 and 4,424,444 are designed to measure $\Sigma_{FM}$, the thermal neutron capture cross section of the formation. As with prior pulsed neutron systems, a 14 MeV pulsed neutron generator source is used to create a time dependent thermal neutron, and hence capture gamma ray, distribution in the vicinity of two gamma ray detectors within the logging tool. The decay rate of the capture gamma radiation measured by the tool is used to obtain $\Sigma_{FM}$, and also a number of other parameters useful in evaluating log quality, borehole conditions, and reservoir performance.

As indicated above, the tool measures count rates in each detector in six different time gates after each neutron burst. These gates, which are dead-time and background count corrected, span the decay from very near the end of one neutron burst until almost the beginning of the next neutron burst. The first two gates are positioned shortly after the end of the burst and detect both formation and borehole count rates. The last four gates are each progressively wider at longer delay times from the neutron burst, and detect primarily formation events. The last gate (Gate 6) is sufficiently delayed from the burst so that a negligible number of counts (generally <3%) in the gate are generated from captures in the borehole fluid.

The six resulting dead-time and background corrected count rates in each detector represent points on the composite formation plus borehole decay curve. These count rates are then adaptively filtered over a short vertical interval in the borehole (one to several feet, depending upon filtering parameters). The main field computer program then uses these six points along the composite formation/borehole decay curve in an iterative least-squares technique to separate the composite curve into the borehole and formation decay components. The computer calculates the formation capture cross section from the slope of the formation decay component. In addition, the computer calculates the borehole capture cross section $\Sigma_{BH}$ from the borehole decay component, and calculates the intercepts for each component (i.e., initial values $A_{FM}$ and $A_{BH}$ at the end of the neutron burst). This procedure is completed for decay data from both the short-spaced (SS) and the long-spaced (LS) detectors. The resulting $\Sigma$FM-SS and $\Sigma_{FM-LS}$ data are as free as possible from borehole effects since, during the computer calculation of $\Sigma_{FM}$, the borehole count rates are essentially "subtracted" from the total observed count rate. The borehole cross section $\Sigma_{BH}$ is useful in identifying changes in borehole fluids and composition.

The field computer program also calculates two data quality parameters, $\Sigma_{QUAL}$ and $R_{BH/FM}$, which can be used to determine how effectively the two exponential program solution matches the observed decay curve. $\Sigma_{QUAL}$ is the short spaced detector ratio of the calculated formation component counts in Gate 6 divided by the total observed counts in Gate 6. Since Gate 6 is farthest from the neutron burst (beginning approximately 460 microseconds after burst termination in the preferred prior art embodiment), almost all the counts in Gate 6 should be formation counts. Hence, $\Sigma_{QUAL}$ should be just slightly less than or equal to 1.

In the field, however, there can be large washed out (and perhaps cement filled) intervals outside the casing. In this environment, there are actually three significant components—borehole fluid, cement, and formation—in the decay curve. In general, the borehole decay in this case will still be very rapid. However, the borehole decay signal will contain count rate decay information from the borehole fluid, and also from the near borehole just outside the casing. This composite borehole signal will in general be separable from the formation component and from whatever residual cement component is not incorporated in the borehole signal. The remaining formation and residual cement decay rates will usually also be different from one another. However, since the computer program is looking for only one other exponential curve, and not two curves, the program will try to fit just one exponential curve to the composite formation exponential and residual cement components in Gates 3 through 6. Graphically, these formation and cement components usually combine in a concave upwardly shaped curve (on a log scale), while the computer-estimated single least squares fitted exponential line through the data points will be a straight line. In such cases, the computer usually underestimates the counts in the last gate (Gate 6). This results in a $\Sigma_{QUAL}$ which is less than 1. ($\Sigma_{QUAL}$ can also be useful in determining if filtrate still exists immediately around the wellbore, and it can be used to locate other borehole anomalies, such as packers, gravel packs, and washouts.)

The other data quality parameter, $R_{BH/FM}$, is a ratio which measures the total borehole counts calculated for the short spaced detector ($=\tau_{BJ}*A_{BH}$) relative to the formation counts calculated for the short spaced detector ($=\tau_{FM}*A_{FM}$), where $\tau$ represents the component lifetime. In other words, $R_{BH/FM}$ indicates the relative contributions in the short spaced detector of the total counts from the borehole and from the formation. $R_{BH/FM}$ increases as borehole size (including washouts) increases, and also increases as formation porosity decreases. $R_{BH/FM}$ can also change when borehole salinity changes or when casing changes.

As will be appreciated from the above, necessarily abbreviated discussion of several of the features of the U.S. Pat. Nos. 4,409,481 and 4,424,444 neutron logging methods and apparatus, these represent substantial advances over the prior art. Nevertheless, further improvements could be provided. For example, it would be useful to know which of the two data quality parameters, $\Sigma_{QUAL}$ and $R_{BH/FM}$, should preferably be used in various borehole conditions. It would be very beneficial to have another method for deriving quality curves for $\Sigma_{FM}$ and $\Sigma_{BH}$. And it would be particularly beneficial to have another (perhaps faster and potentially simpler) method for obtaining a parameter indicative of the borehole capture cross section $\Sigma_{BH}$. In fact, with regard to measuring and indicating $\Sigma_{BH}$, it should be particularly noted that changes in the borehole cross section can provide very important data about a well. Therefore, a rapid and simple $\Sigma_{BH}$ indicating measurement, even if only qualitative, would be a valuable improvement.

SUMMARY OF THE INVENTION

Briefly, the present invention meets the above needs and purposes with a new and improved method and apparatus for pulsed neutron capture measurement of borehole conditions and formation neutron lifetimes. In simultaneously measuring the thermal neutron decay time of materials in and about the well borehole, as in the logging tools and methods described above, the present invention begins by generating, in the well borehole, a relatively short duration discrete burst of fast neutrons, which are then rapidly moderated by interaction with nuclei of the materials in the borehole and surrounding earth formations and slowed down to thermal energy. This creates a thermal neutron population in the borehole and the surrounding earth formations.

Next the radiations representative of the thermal neutron population in the borehole and surrounding earth formations are detected in the borehole. These are detected in at least four, and preferably six or more time intervals subsequent to the burst of fast neutrons. Corresponding count signals are then generated which are representative of the thermal neutron population during each of the time intervals. In the preferred embodiment the first two time intervals are chosen to maximize the borehole component radiations.

Next, in the preferred embodiment, the count signals are combined by an iterative least squares fitting technique to exponential relationships assumed to exist for the borehole and earth formation components of the thermal neutron decay time. The borehole and formation decay components are thereby simultaneously separated to derive corresponding measurement signals representative of the thermal neutron decay times of the borehole medium and the earth formation medium in the vicinity of the borehole.

In any pulsed neutron analysis technique, it can be very useful to determine a relatively simple parameter which is indicative of the neutron decay in the borehole. Therefore, in one embodiment, a measurement indicator representative of the thermal neutron decay time of the borehole medium is also developed by taking the ratio of the counts from the first two time intervals. The decay rate of the shallow thermal neutron population is in general more rapid than the deeper, especially in prospective oil or gas bearing formations of interest. Hence, during such time gates within the first 200 μs following the neutron burst, it is possible to observe the count rates (capture gamma or thermal neutron) when shallow, or borehole region, counts are significant (and in many situations dominate the formation counts). These count rates are then used to independently determine a parameter indicative of decay in the near borehole region.

More specifically, in this embodiment of the invention the first two time gate measurements are made during the first 200 μs after the neutron burst. The ratio of the counts in the first two time gates alone is then taken as an initial borehole $\Sigma_{BH}$ indicator. This borehole region decay parameter, in addition to being output on a log, can then be used to determine near borehole properties and/or changes in near borehole properties. Since these two data points contain some formation counts, this initial indicator can then be further refined to compensate for formation effects by incorporating or using it in combination with a formation cross section ($\Sigma_{FM}$). This formation cross section can be measured, for example, by using either the technique of the above-noted U.S. Pat. No. 4,424,444, or earlier known single exponential techniques for measuring $\Sigma_{FM}$.

Since more time intervals are utilized in the methods of the above-noted prior art U.S. Pat. Nos. 4,409,481 and 4,424,444 than necessary to specify the two exponential relationships, and since the borehole/earth formation system includes other sub-systems such as cement, the least squares fitting will be expected to have residuals from the various count signals. These residuals are therefore utilized to develop quality indicating signals for the corresponding measurement signals. A total residual can be developed for the borehole measurement signal if more than two gates are used to calculate the borehole decay, and another for the earth formation measurement signal (calculated from three or more gates). They each provide a measure of how much "extraneous" signal has gotten into the measurement. This "extraneous" signal could be the other measurement signal (formation in the borehole measurement, or vice versa), or a third signal (e.g., cement), or a combination of the interfering signals.

The invention also provides for selecting between quality parameters depending upon the salinity of the borehole region materials. A first quality parameter ($\Sigma_{QUAL}$), preferred when the fluid in the borehole region has a relatively low salt content and correspondingly long thermal neutron decay time, is the ratio of the formation count signal predicted by the measurement signal for the last time interval to the total observed counts in this last time interval, or alternatively the residual from the formation component least squares fit. The second quality parameter ($R_{BH/FM}$), preferred when the fluid in the borehole has a relatively high salt content and correspondingly short thermal neutron decay time, is the ratio of the total borehole count signals predicted by the measurement signal to the total formation count signals predicted by the measurement signal.

These and other features and advantages of the invention will be apparent from the following description, the accompanying drawings and the appended claims.

DESCRIPTION OF THE PREFERRED EMBODIMENT

With reference to the drawings, the new and improved apparatus for pulsed neutron capture measurement of borehole conditions and formation neutron lifetimes, and the method therefor according to the present invention, will be described.

Figure 1:
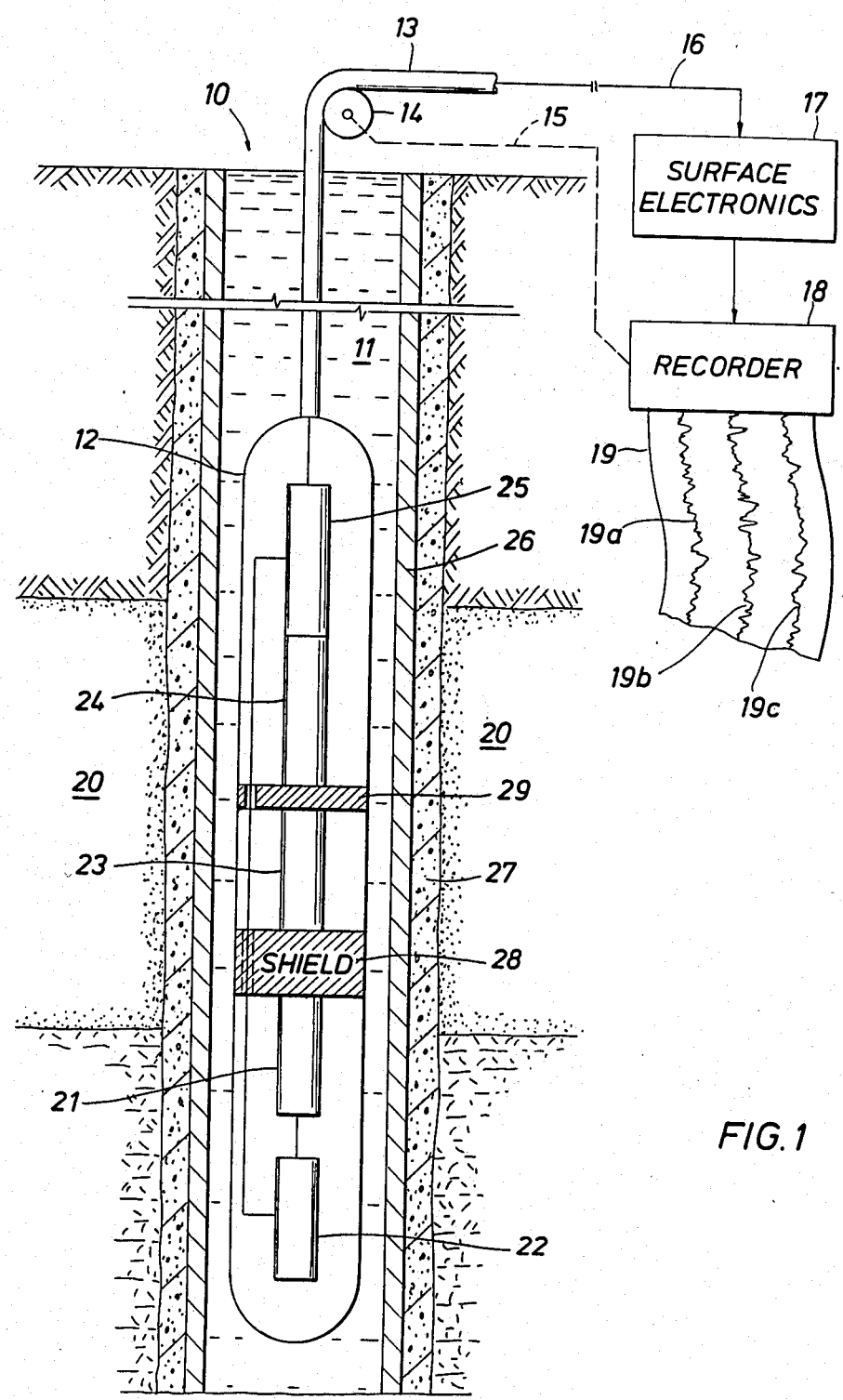
FIG. 1 is a schematic illustration showing a well logging system for performing nuclear earth formation measurements in a borehole according to the present invention.

Referring to FIG. 1, a well logging system in accordance with the concepts of the present invention is illustrated schematically. A well borehole 10, which is filled with a borehole fluid 11, penetrates the earth formations 20 under investigation. A downhole well logging sonde 12 is suspended in the borehole 10 via a conventional armored logging cable 13, in a manner known in the art, such that the sonde 12 may be raised and lowered through the borehole as desired. The well logging cable 13 passes over a sheave wheel 14 at the surface. The sheave wheel is electrically or mechanically coupled, as indicated by dotted line 15, to a well logging recorder 18 which may comprise an optical recorder, or magnetic tape, or both, as known in the art. Recorder 18 is shown making a record on a conventional paper chart 19 having curves 19a, 19b, and 19c, for example, recorded thereon. The record of measurements made by the downhole sonde 12 may thus be recorded as a function of the depth in the borehole of the sonde 12.

In the downhole sonde 12, a neutron generator 21 is supplied with high voltage (approximately 100 kilovolts) by a high voltage power supply 22. Control and telemetry electronics 25 are utilized to supply control signals to the high voltage supply and the neutron generator 21 and to telemeter information measured by the downhole instrument to the surface via the logging cable 13.

Longitudinally spaced from the neutron generator 21 are two radiation detectors 23 and 24. Radiation detectors 23 and 24 may comprise, for example, thallium activated sodium iodide crystals which are optically coupled to photomultiplier tubes. The detectors 23 and 24 serve to detect gamma radiation produced in the surrounding formations 20 resulting from the action of the neutron generator 21 in emitting neutrons. A neutron shielding material 28 having a high density matter content or large scattering cross-section is interposed between the neutron generator 21 and the dual spaced detectors 23 and 24, in order to prevent direct irradiation of the detectors by neutrons emitted by the neutron generator 21. Shielding 29 may also be interposed between the detectors 23 and 24 if desired.

Upon activation of the neutron generator 21, a burst, or pulse, of neutrons of approximately 60 microseconds duration is initiated and emitted into the well borehole 10, borehole fluid 11, and through the steel casing 26 and cement layer 27 surrounding the steel casing, into the earth formations 20 being investigated. The neutron burst is moderated or slowed down by scattering interactions such that the neutrons are all essentially at thermal energy. The thermalized or thermal neutrons then begin capture interactions with the elemental nuclei of constituents of the borehole and of the adjacent cement and earth formations and the pore spaces contained therein.

The capture of neutrons by nuclei of the borehole and formation elements and pore spaces produces capture gamma rays which are emitted and impinge upon detectors 23 and 24. A voltage pulse is produced from the respective photomultipliers of detectors 23 and 24 for each gamma ray so detected. These voltage pulses are supplied to the electronics section 25, counted in a digital counter, and are telemetered to the surface via a conductor 16 of the well logging cable 13. At the surface, a surface electronics package 17 detects the telemetered information from the downhole sonde 12 and performs suitable processing, by methods known in the prior art and discussed below, to determine the measured quantities, which are then supplied to the recorder 18 where they are recorded as a function of borehole depth.

The thermal neutron capture cross section measurements provided by such pulsed neutron tools are then used in calculating formation water saturation. However, if the formation cross sections which are measured are affected by changes in borehole conditions, then all subsequent calculations will be in error. For example, in fitting a two exponential analytical model to the actual observed six points along the decay curve 50 (FIG. 2), if there are significant non-exponential or additional exponential components, such as the residual cement component 55, the two exponential fit to the data (cf. the borehole component 58 and earth formation component 60 in FIG. 2) will be perturbed. Since the depth of investigation of pulsed neutron logs is limited to the first foot of the formation and the borehole adjacent to the logging tool, borehole caliper can therefore be important. In badly washed out intervals this first foot may be to a large degree filled with cement, and hence pulsed neutron $\Sigma$ values can be severely affected by the borehole region. (This is especially true, incidentally, with older prior art single exponential pulsed neutron logging systems which are unable to actively remove the effects of the borehole.)

In general, the borehole fluid component decay is very rapid and will contain count rate decay information from the borehole fluid, and also from the near borehole just outside the casing. This composite borehole signal will in general be separable from the formation component and from whatever residual cement component is not incorporated in the borehole signal, since the relative decay rates in formations and residual cement is much slower. If the cement region is relatively small, then virtually all the cement counts will be combined into the borehole component, and hence a two exponential model will in general be able to isolate effectively the borehole decay from the decay in the formation. If the cement region is large, however, a portion of the cement count rate will not be absorbed into the borehole signal. This residual cement signal will be combined instead with the formation component.

Figure 2:
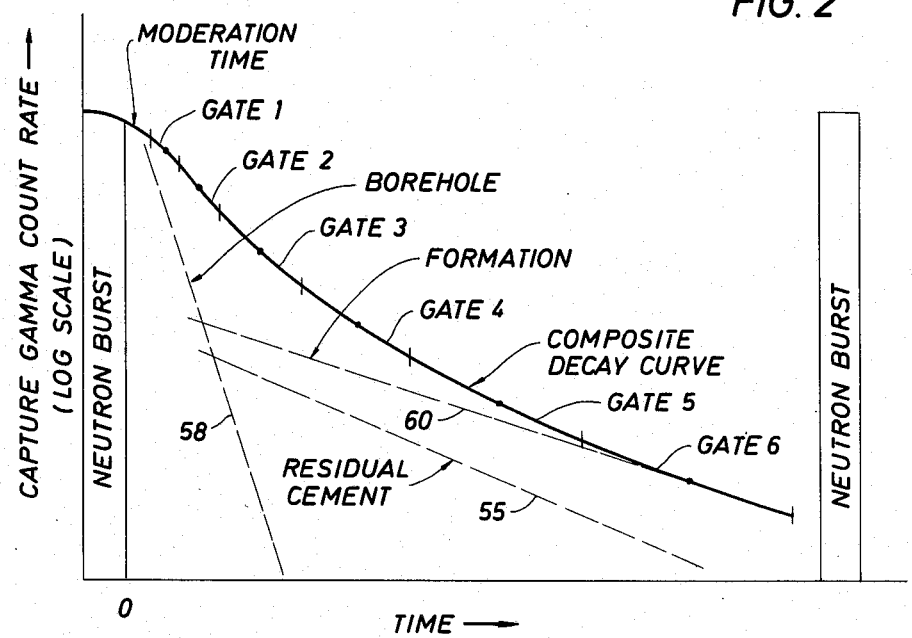
FIG. 2 is a graphical illustration of the thermal neutron decay curve fitted to the count rates from the six time gates, and also showing the borehole, residual cement, and formation components thereof.
Figure 3:
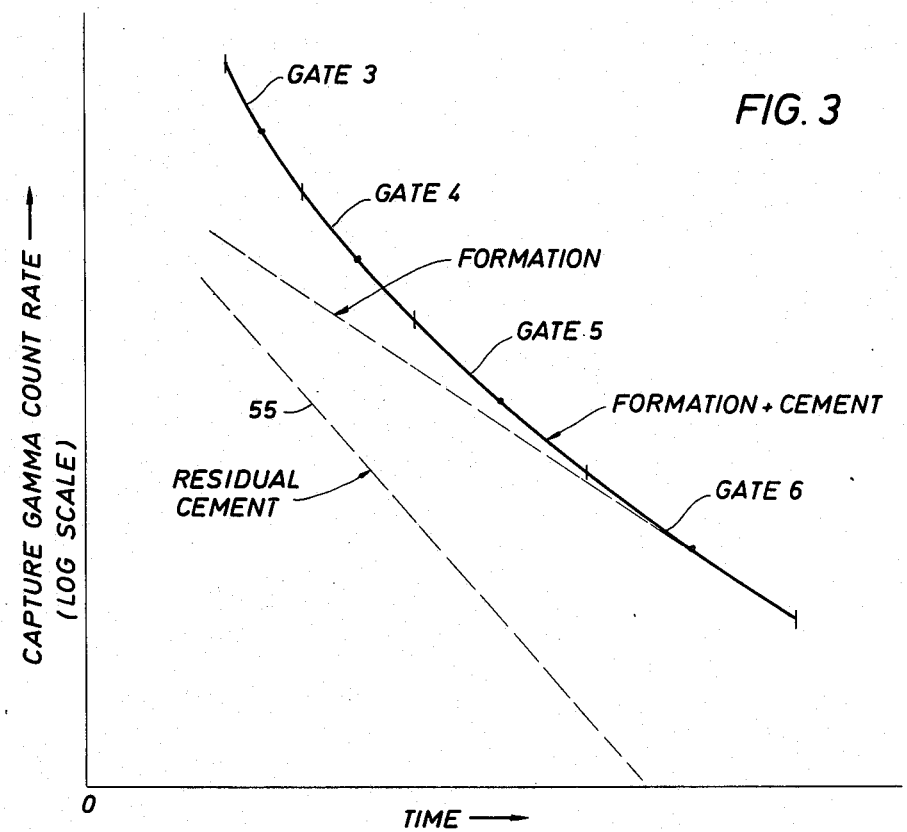
FIG. 3 is a graphical illustration similar to FIG. 2, with the borehole component removed.

If the borehole exponential component is "stripped" from the remaining formation and residual cement decay components in the two exponential program, as illustrated in FIG. 3, then the remaining count rate decay from the formation and cement will necessarily have to be approximated by the remaining single exponential. In other words, the third component, residual cement, will be "lumped" in large or washed-out borehole intervals with the formation component. The residual cement component will be especially significant if the cement decay is relatively slow, i.e., if low salinity materials are present in the cement and borehole fluid. With the system described in the above-noted U.S. Pat. Nos. 4,409,481 and 4,424,444, there are four points along this composite formation/cement decay—more than enough to define an exponential curve. (Two parameters are required to define an exponential curve—initial value and slope). Thus the system is overdefined and can be least squares fitted. In general the four points along the composite formation/cement decay in large boreholes will not be on a single exponential decay curve since decay in the residual cement (which may or may not be exponential) will usually be different from the exponential formation decay. This is illustrated in FIGS. 2–4, showing the graphical decay points (six points on total decay curve, and four points along the curve with the borehole component removed).

Figure 4:
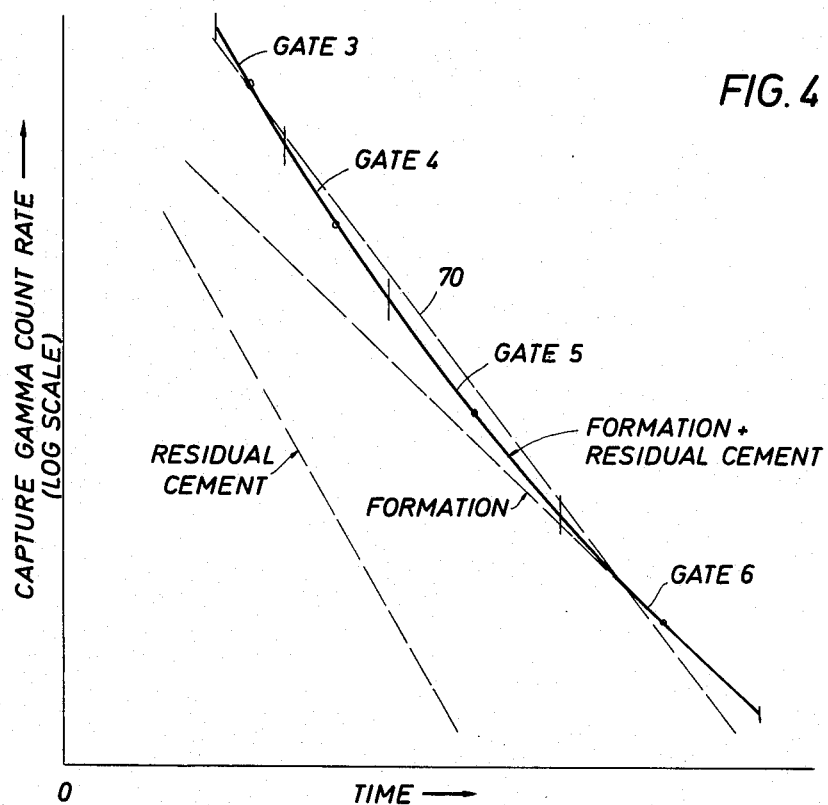
FIG. 4 is a graphical illustration showing a least squares fit to the curve shown in FIG. 3.
Figure 5:
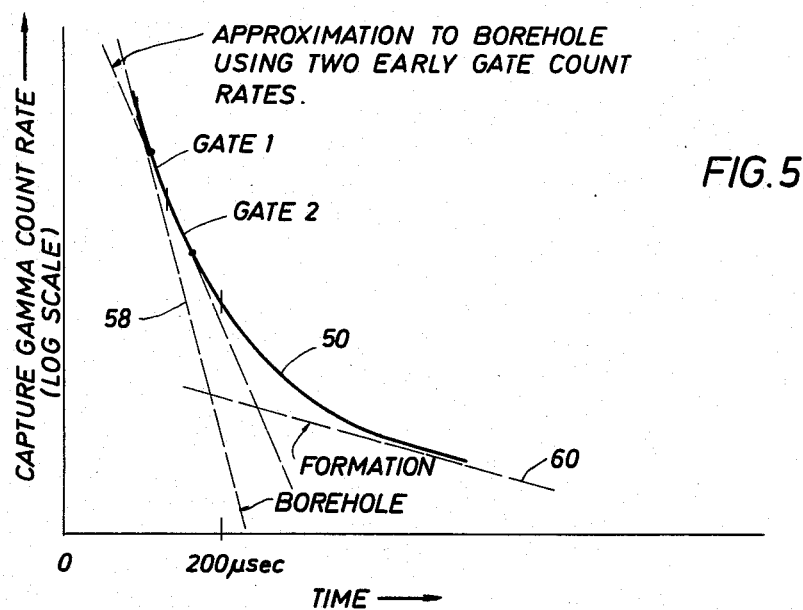
FIG. 5 is a graphical illustration showing the borehole and formation decay curves and the use of two gate count rates to independently provide a measurement indicative of $\Sigma_{BH}$ in the first 200 μs after the end of the neutron burst, before formation counts dominate.

The four points in FIG. 4 are not in a straight line (log scale); hence a least squares fit will not pass through all the points. In general the curve defined by the four points will have a concave upward shape (if the residual cement component is exponential or pseudo-exponential), and hence a least squares fit line 70 through the data will appear as shown in FIG. 4. The total residual of these data points from the least squares calculation will indicate the amount the points differ or deviate from a perfect fit to a single exponential curve (ignoring statistical measurement factors), and hence the residual will indicate the degree of cement "interference" in the formation decay. The larger the residual, the more the cement effect. Of course it should be noted that any number of points greater than two which are used to define the "formation" exponential will result in a residual with a similar interpretation. Therefore, in both cases these residuals are an excellent inverse indication of the quality of the corresponding cross section measurement. The $\Sigma_{QUAL}$ measurement is similarly useful in this situation since it measures the deviation of the gate 6 count rate from the least squares fitted line.

In salty boreholes, on the other hand, where the fluid in the borehole has a high salt content (and there is perhaps a high salt content in the cement as well), $R_{BH/FM}$ works particularly well as a quality indicator. When the salt content is high, borehole and cement decay may be too rapid to affect the formation residual described above. Likewise, such a rapid decay may adversely affect the accuracy of the $\Sigma_{QUAL}$ indicator of borehole conditions. In this case (high chlorine in the borehole region), many gamma rays are given off in the borehole region since multiple chlorine gamma rays are emitted following capture. Hence the borehole count rate integral is large and still meaningful even in such a rapid-decay borehole. Thus $R_{BH/FM}$ is a very good borehole size or data quality indicator in high salinity boreholes.

Figure 6:
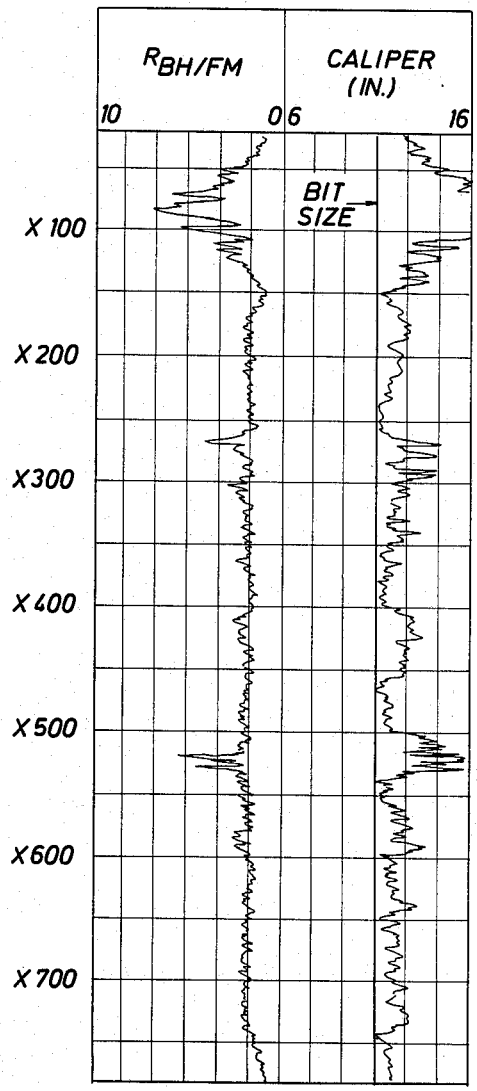
FIG. 6 is a portion of a log of a salty borehole illustrating how $R_{BH/FM}$ can be used as a borehole size indicator.

$R_{BH/FM}$ is especially sensitive to borehole size changes, with the ratio increasing as the borehole size increases. The cement component which combines with the borehole fluid will therefore be sensed by $R_{BH/FM}$, and will readily indicate such features as washouts. This is illustrated, for example, in FIG. 6, which shows a portion of the $R_{BH/FM}$ log of a well with salty borehole fluid and cement. The correspondence between $R_{BH/FM}$ and the caliper for the borehole is striking, and shows clearly how $R_{BH/FM}$ can be used in such cases to give a very good indication of borehole size. And, since neutron measurements are shallow, it will be further appreciated that increasing borehole size (caliper) will correlate with decreasing $\Sigma_{FM}$ measurement reliability—hence the utility of $R_{BH/FM}$ as a quality indicator in salty boreholes.

In any pulsed neutron analysis technique, it can be very useful to determine a relatively simple parameter which is indicative of the neutron decay in the borehole region. As discussed earlier, following a burst of high energy neutrons from a pulsed neutron source, a thermal neutron population is generated both in the vicinity of the borehole and out in the formation. The decay rate of shallow events is in general more rapid than of the deeper events, especially in prospective oil or gas bearing formations of interest. Hence it should be possible, especially at relatively short spaced detector positions where the borehole relative to the formation signal is maximized (though possible at all spacings), to observe the count rates (capture gamma or thermal neutron) in time gates within the expected time interval (0–200 μs following the burst) when shallow, or borehole region, counts are significant, and in fact in many situations may dominate the formation counts. These count rates can then be independently used to determine a parameter indicative of decay in the near borehole region. The prior art technique for doing this, discussed above, is to unfold the shallow (borehole) and deep (formation) count rate signals using the technique described in the above-noted U.S. Pat. No. 4,424,44. This technique assumes that both components decay exponentially, and that the borehole region component has the more rapid decay constant. However, as taught by the present invention, another technique to measure the shallow, near borehole signal is to derive it directly from the count rate decay during an early (first 200 μs or less) time interval after the neutron bursts, when the borehole region count rates are appreciable relative to formation counts. This early time shape distribution coule assume pure exponential decay in the borehole region, or it could be assumed that the decay is composed of an exponential plus one or more terms (experimentally or theoretical derived) to account for neutron diffusion in the borehole region and/or net neutron migration into and out of the borehole region.

In this embodiment of the invention, the first two time gate measurements are made during the first 200 μs after the neutron burst. The ratio of the counts in the first two time gates along is then taken as an initial borehole $\Sigma_{BH}$ indicator. This borehole region decay parameter, in addition to being output on a log, can then be used to determine near borehole properties and/or changes in near borehole properties. Since these two data points contain some formation counts, this initial indicator can then be further refined or corrected for formation effects by incorporating or using it in combination with a deep formation cross section ($\Sigma_{FM}$), also independently derived at the same spacing. $\Sigma_{FM}$ can be obtained, for example, by using either the technique of the above-noted U.S. Pat. No. 4,424,444, or earlier known single exponential techniques for measuring $\Sigma_{FM}$. The borehole decay parameter could also be combined with a deep formation cross section as measured using any of these techniques at a longer distance from the neutron source, where borehole interference is minimized. If more than two points are used to define a borehole component indicator in this embodiment, then a least squares fitting technique could be employed to determine the borehole decay parameter, and as described earlier, the residual from such a least squares fit could be used to indicate the amount of formation or migration influence in the borehole decay parameter (the more influence, the larger the residual to the fit of the borehole decay).

As may be seen, therefore, the present invention has numerous advantages. It furnishes any of several very useful quality indicators, along with appropriate criteria for selecting which to use. It furnishes a particularly useful indicator for the borehole capture cross section $\Sigma_{BH}$, and the method therefore can readily be adapted to use in a wide variety of pulsed neutron logging tools. For example, these are provided from the same time interval count signals already available from the methods and tools disclosed in the above-noted U.S. Pat. Nos. 4,409,481 and 4,424,444, thereby considerably enhancing the usefulness of such inventions.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for measuring the thermal neutron decay time of materials in and about a well borehole, comprising:
   (a) generating, in the well borehole, a relatively short duration discrete burst of fast neutrons which are rapidly moderated by interaction with nuclei of materials in the borehole and surrounding earth formations and slowed down to thermal energy, creating a thermal neutron population in the borehole and surrounding earth formations,
   (b) detecting, in the borehole, radiations representative of the thermal neutron population in the borehole and surrounding earth formations, in at least two time intervals subsequent to said burst of fast neutrons, said at least two time intervals being chosen to maximize the borehole component radiations relative to the formation component, and generating at least two count signals representative of said thermal neutron population during said at least two time intervals, and
   (c) combining said count signals from said at least two borehole count maximizing time intervals according to a predetermined relationship to provide a measurement indicator representative of the thermal neutron decay time of the borehole medium.

2. The method of claim 1 wherein said step of combining the counts from at least two of said borehole count maximizing time intervals further comprises taking the ratio of said counts.

3. The method of claim 1 wherein said at least two time intervals are timed to occur during the first two hundred microseconds after the end of said burst of fast neutrons.

4. The method of claim 1 further comprising refining said borehole medium thermal neutron decay time measurement indicator by incorporating into it information from an earth formation capture cross section measurement signal according to a predetermined relationship.

5. The method of claim 1 wherein said detecting step includes detecting said radiations in at least three time intervals subsequent to said burst of fast neutrons.

6. The method of claim 5 wherein said step of combining said count signals to provide a measurement indicator representative of the thermal neutron decay time of the borehole medium further comprises combining at least three of said count signals using a least squares fitting technique to exponential relationships assumed to exist for said borehole thermal neutron decay time.

7. The method of claim 6 further comprising generating, from the residuals from said least squares fitting, an indication of the amount of formation interference in said borehole measurement indicator.

8. The method of claim 1 further comprising repeating said preceding steps at a plurality of different depths in the well borehole and recording said measurement indicator for each of said plurality of depths in the borehole.

9. The method of claim 1 wherein the detecting step is performed by detecting gamma radiations resulting from the capture of thermal neutrons by nuclei of materials in and about the borehole.

10. The method of claim 1 wherein said generating step is performed using a source of approximately 14 MeV neutrons generated by a deuterium-tritium type accelerator tube.

11. A method for simultaneously measuring the thermal neutron decay time of materials in and about a well borehole, comprising:
(a) generating, in the well borehole, a relatively short duration discrete burst of fast neutrons which are rapidly moderated by interaction with nuclei of materials in the borehole and surrounding earth formations and slowed down to thermal energy, creating a thermal neutron population in the borehole and surrounding earth formations,
(b) detecting, in the borehole, radiations representative of the thermal neutron population in the borehole and surrounding earth formations, in at least four time intervals subsequent to said burst of fast neutrons, at least two of said time intervals being chosen to maximize the borehole component radiations relative to the formation component, and generating at least four count signals representative of said thermal neutron population during said at least four time intervals,
(c) combining said count signals from said at least two borehole count maximizing time intervals according to a predetermined relationship to provide a measurement indicator representative of the thermal neutron decay time of the borehole medium, and
(d) simultaneously deriving from said count rate signals at least one measurement signal representative of the thermal neutron decay time of the earth formation medium in the vicinity of the borehole.

12. The method of claim 11 wherein said step of combining the counts from at least two of said borehole count maximizing time intervals further comprises taking the ratio of said counts.

13. The method of claim 11 wherein said at least two time intervals which maximize the borehole component radiations relative to the formation component are timed to occur during the first two hundred microseconds after the end of said burst of fast neutrons.

14. The method of claim 11 further comprising refining said borehole medium thermal neutron decay time measurement indicator by incorporating into it information from an earth formation capture cross section measurement signal according to a predetermined relationship.

15. The method of claim 11 wherein said detecting step includes detecting said radiations in at least six time intervals subsequent to said burst of fast neutrons.

16. The method of claim 15 wherein said step of combining said count signals to provide a measurement indicator representative of the thermal neutron decay time of the borehole medium further comprises combining at least three of said count signals using a least squares fitting technique to exponential relationships assumed to exist for said borehole thermal neutron decay time.

17. The method of claim 16 further comprising generating, from the residuals from said least squares fitting, an indication of the amount of formation interference in said borehole measurement indicator.

18. The method of claim 11 further comprising repeating said preceding steps at a plurality of different depths in the well borehole and recording said measurement indicator and measurement signal for each of said plurality of depths in the borehole.

19. The method of claim 11 wherein the detecting step is performed by detecting gamma radiations resulting from the capture of thermal neutrons by nuclei of materials in and about the borehole.

20. The method of claim 11 wherein said generating step is performed using a source of approximately 14 MeV neutrons generated by a deuterium-tritium type accelerator tube.

21. The method of claim 11 wherein said detecting step includes detecting said radiations in at least five time intervals subsequent to said burst of fast neutrons, and said deriving step includes a least squares fitting technique to exponential relationships assumed to exist for said earth formation thermal neutron decay time.

22. A method for simultaneously measuring the thermal neutron decay time of materials in and about a well borehole, comprising:
(a) generating, in the well borehole, a relatively short duration discrete burst of fast neutrons which are rapidly moderated by interaction with nuclei of materials in the borehole and surrounding earth formations and slowed down to thermal energy, creating a thermal neutron population in the borehole and surrounding earth formations,
(b) detecting, in the borehole, radiations representative of the thermal neutron population in the borehole and surrounding earth formations, in at least five time intervals subsequent to said burst of fast neutrons, and generating at least five count signals representative of said thermal neutron population during said at least five time intervals,
(c) combining said at least five count signals according to a predetermined relationship to simultaneously separate the borehole and formation decay components and to derive at least two measurement signals representative of the thermal neutron decay times of the borehole medium and the earth formation medium in the vicinity of the borehole, and (d) determining at least one quality signal for a corresponding predetermined said measurement signal as a predetermined function of the corresponding deviation from perfect fit obtained in said preceding step of combining said count signals to derive said predetermined measurement signal.

23. The method of claim 22 wherein said combining step includes a least squares fitting technique to an exponential relationship assumed to exist for said borehole component of thermal neutron decay time, and said deviation is obtained from the residual resulting from said least squares fitting.

24. The method of claim 22 wherein said combining step includes a least squares fitting technique to exponential relationships assumed to exist for said formation component of thermal neutron decay time, and said deviation is obtained from the residual resulting from said least squares fitting.

25. The method of claim 22 wherein said predetermined measurement signal is the signal representative of the thermal neutron decay time of the borehole medium, and said quality signal is representative of the cement effect contained in said borehole measurement signal.

26. The method of claim 22 wherein said predetermined measurement signal is the signal representative of the thermal neutron capture cross section of the borehole medium, and said quality signal is representative of the formation effect contained in said borehole measurement signal.

27. The method of claim 22 wherein said predetermined measurement signal is the signal representative of the thermal neutron decay time of the earth formation medium, and said quality signal is representative of the cement effect contained in said earth formation measurement signal.

28. The method of claim 22 wherein said detecting step includes detecting said radiations in at least six time intervals subsequent to said burst of fast neutrons.

29. The method of claim 22 further comprising repeating said preceding steps at a plurality of different depths in the well borehole and recording said measurement and quality signals for each of said plurality of depths in the borehole.

30. A method for simultaneously measuring the thermal neutron decay time of materials in and about a well borehole, comprising:

(a) generating, in the well borehole, a relatively short duration discrete burst of fast neutrons which are rapidly moderated by interaction with nuclei of materials in the borehole and surrounding earth formations and slowed down to thermal energy, creating a thermal neutron population in the borehole and surrounding earth formations, (b) detecting, in the borehole, radiations representative of the thermal neutron population in the borehole and surrounding earth formations, in at least five time intervals subsequent to said burst of fast neutrons, and generating at least five count signals representative of said thermal neutron population during said at least five time intervals, (c) combining said at least five count signals according to a predetermined relationship to simultaneously separate the borehole and formation decay components and to derive at least two measurement signals representative of the thermal neutron decay times of the borehole medium and the earth formation medium in the vicinity of the borehole, (d) determining a first quality parameter as the ratio of the formation count signal predicted by said measurement signal for the last of said time intervals to the total observed counts in said last time interval, (e) determining a second quality parameter as the ratio of the total borehole component count signal predicted by said measurement signal to the total formation component count signal predicted by said measurement signal, and (f) using said first quality parameter as an indicator of borehole effects and conditions when the fluid in the borehole has a relatively low salt content and correspondingly long thermal neutron decay time, and using said second quality parameter as an indicator of borehole effects and conditions when the borehole fluid has a relatively high salt content and correspondingly short thermal neutron decay time.

31. The method of claim 30 wherein said detecting step includes detecting said radiations in at least six time intervals subsequent to said burst of fast neutrons.

32. The method of claim 30 wherein said first quality parameter is determined from the residual to a least squares fitting procedure used to obtain the formation medium measurement signal.

33. The method of claim 30 further comprising repeating said preceding steps at a plurality of different depths in the well borehole and recording said measurement signals and quality parameters for each of said plurality of depths in the borehole.

* * * * *